United States Patent
Althaus

(10) Patent No.: US 12,296,723 B2
(45) Date of Patent: May 13, 2025

(54) ELECTRIC HEATING AND CAPACITIVE SENSING ARRANGEMENT AND METHODS FOR MANUFACTURING THE SAME

(71) Applicant: IEE INTERNATIONAL ELECTRONICS & ENGINEERING S.A., Echternach (LU)

(72) Inventor: Frank Althaus, Saarbrücken (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 0 days.

(21) Appl. No.: 18/576,728

(22) PCT Filed: Jun. 30, 2022

(86) PCT No.: PCT/EP2022/068041
§ 371 (c)(1),
(2) Date: Jan. 4, 2024

(87) PCT Pub. No.: WO2023/280671
PCT Pub. Date: Jan. 12, 2023

(65) Prior Publication Data
US 2024/0262258 A1    Aug. 8, 2024

(30) Foreign Application Priority Data
Jul. 7, 2021    (LU) .................... LU500403

(51) Int. Cl.
*B60N 2/00* (2006.01)
*B60N 2/56* (2006.01)
*H05B 3/00* (2006.01)

(52) U.S. Cl.
CPC ......... *B60N 2/0021* (2023.08); *B60N 2/5685* (2013.01); *H05B 3/0042* (2013.01); *H05B 2203/011* (2013.01); *H05B 2203/017* (2013.01)

(58) Field of Classification Search
CPC ...... B60N 2/0021; B60N 2/0024; B60N 2/56; B60N 2/5685; H03K 17/955;
(Continued)

(56) References Cited

U.S. PATENT DOCUMENTS

2001/0045733 A1\* 11/2001 Stanley ................ B60N 2/0024
180/273
2018/0332663 A1\* 11/2018 Lisseman ............... B60N 2/002
2022/0167465 A1\* 5/2022 Amorosi ................ B62D 1/065

FOREIGN PATENT DOCUMENTS

| WO | 2018096520 A1 | 5/2018 |
| WO | 2020174000 A1 | 9/2020 |
| WO | 2021032640 A1 | 2/2021 |

OTHER PUBLICATIONS

International Search Report corresponding to application PCT/EP2022/068041, dated Oct. 21, 2022, 4 pages.
(Continued)

*Primary Examiner* — Sang Y Paik
(74) *Attorney, Agent, or Firm* — Reising Ethington P.C.

(57) ABSTRACT

An electric heating and capacitive sensing arrangement that includes: an electrically conductive heating track arranged on a surface of a planar substrate, the electrically conductive track being connectable to a current source so that during a heating operation a current flows through the electrically conductive track. The electrically conductive track is connectable to a capacitive sensing circuit so that during a sensing operation a capacitive sensing signal is applied to the electrically conductive track. The electrically conductive track has at least a first and a second heating track section extending at a distance along each other on the substrate, whereby a gap is formed between the first and the second heating track section. The heating and sensing arrangement further includes a layer of electrically conductive material
(Continued)

arranged on the surface of the substrate in the gap between the first and the second heating track section.

11 Claims, 4 Drawing Sheets

(58) Field of Classification Search
CPC ............ B60R 21/015; B60R 21/01512; B60R 21/0153; B60R 21/01532; H05B 3/0042; H05B 3/10; H05B 3/12; H05B 3/14; H05B 3/16; H05B 3/34–347; H05B 3/54–58; H05B 2203/002–004
USPC ........................................................ 219/202
See application file for complete search history.

(56) References Cited

OTHER PUBLICATIONS

Written Opinon corresponding to application PCT/EP2022/068041, dated Oct. 21, 2022, 5 pages.

\* cited by examiner

ELECTRIC HEATING AND CAPACITIVE SENSING ARRANGEMENT AND METHODS FOR MANUFACTURING THE SAME

TECHNICAL FIELD

The invention relates to an electric heating and capacitive sensing arrangement, in particular for automotive applications, and methods of manufacturing such an electric heating and capacitive sensing arrangement.

BACKGROUND

It is known in the field of automotive vehicle sensor applications to use sensors for so-called Hands off Detection (HOD) systems, wherein one or several sensors provide information about whether a driver has his hands on a steering wheel. This information may be provided as an input to an Automatic Driver Assistance System (ADAS) such as an Adaptive Cruise Control (ACC), which, based on the provided sensor signal, can warn the driver and remind him to re-take control of the steering wheel again. It is further known to use capacitive sensors in HOD systems, wherein capacitive sensors are used for the detection of the presence and/or the position of a conductive body or body portion in the vicinity of an antenna electrode.

As used herein, the term "capacitive sensing arrangement" designates a sensor, which generates a signal responsive to the influence of what is being sensed (a person, a part of a person's body, a pet, an object, etc.) upon an electric field. In a general manner, a capacitive sensing arrangement usually comprises at least one antenna electrode, to which is applied an oscillating electric signal and which thereupon emits an electric field into a region of space proximate to the antenna electrode, while the sensing arrangement is operating. The sensor comprises at least one sensing electrode—which may be identical with or different from emitting antenna electrodes—at which the influence of an object or living being on the electric field is detected.

In some (so-called "loading mode") capacitive sensors, the at least one antenna electrode serve at the same time as sensing electrode. In this case, a measurement circuit determines a current flowing into the at least one antenna electrode in response to an oscillating voltage being applied to them. The relationship of voltage to current yields the complex impedance between the at least one antenna electrode and ground potential. In an alternative version of capacitive sensors ("coupling mode" capacitive sensors), the transmitting antenna electrode(s) and the sensing electrode(s) are separate from one another. In this case, the measurement circuit determines a current or voltage that is induced in the sensing electrode when at least one transmitting antenna electrode is being operated.

A capacitive sensing arrangement is often arranged in the vicinity of an electric heating arrangement comprised in a vehicle seat heater or a vehicle steering wheel heater. Since heater members, for instance heater wires, are regularly electrically connected to the vehicle ground, they may have a large effect on a capacitive sensor signal to be measured.

Electric heating arrangements are widely used in the automotive industry. Such heating devices should not be visible or perceptible for a vehicle user as long said heating arrangement is not in operation. Generally, an electrical heating arrangement may be integrated in or covered by another component, for example a trim cover of a steering wheel. It is a typical requirement to provide an even or uniform heating up after the heating arrangement has been activated, e.g. a heating up following a predeterminable heat rate of several degrees Celsius in a specified time interval. An even heating up prevents the generation of hot spots and/or cold areas. These requirements generally disenable the use of conventional heating wires such as wires based on copper or copper-nickel-(manganese) based alloys, which provide a rather low resistivity temperature dependence and which might also be perceived by a driver.

SUMMARY

It is therefore desirable to provide an improved electrical heating and capacitive sensing arrangement, in particular an electric heating and capacitive sensing arrangement for an automotive application, wherein said electrical heating and sensing arrangement prevents the occurrence of hot spots during a heating operation whilst providing an enhanced sensing functionality. This object is achieved by the subject-matter of the independent claim(s).

In one aspect of the present invention, the object may be achieved by an electric heating and capacitive sensing arrangement comprising: a planar substrate; an electrically conductive heating track arranged on a surface of said substrate, the electrically conductive track being connectable to a current source so that during a heating operation a current flows through the electrically conductive track. The electrically conductive track is connectable to a capacitive sensing circuit so that during a sensing operation a capacitive sensing signal is applied to the electrically conductive track. The electrically conductive track comprises at least a first heating track section and a second heating track section extending at a distance along each other on said substrate, whereby a gap is formed between said first heating track section and the second heating track section. The heating and sensing arrangement further comprises a layer of electrically conductive material arranged on the surface of the substrate in the gap between the first heating track section and the second heating section track section. A width of the layer of electrically conductive material is smaller than a width of the gap between said first heating track section and second heating track section. The layer is arranged so as to be separated from the first heating track section and the second heating track section. The heating and sensing arrangement further comprises a gate member of electrically conductive material, said gate member being arranged within a portion of the gap and extending between the layer of electrically conductive material and a single one of the first heating track section and second heating track section so as to locally connect the layer of electrically conductive material to the one of the first heating track section and second heating track section.

The term "substrate" generally refers to a material having a flat shape configured to support the electrically conductive heating track. The substrate may e.g. comprise a plastic foil comprising at least one of the following: polyethylene terephthalate (PET), thermoplastic polyurethane (TPU), Polyurethane (PU), a plastic, a polymer, or mixtures thereof.

The term "separated" generally refers to a spatial separation or an isolation. Due to the different widths, a channel-like structure is formed between the layer of electrically conductive material and first heating track section and the second heating track section. As a consequence, the layer of electrically conductive material may be spatially separated from the electrically conductive heating track, respectively the first and the second heating track sections.

The term "gate member" generally refers to an element formed of a conductive material. It should be noted that the gate member may substantially extend in a direction of the extension of the first and second track section(s). The gate member may be particularly small with regard to the extension of the layer of electrically conductive material, such that an electrical sensing signal may pass the gate member from the respective heating track section whilst no heating current flows through the layer of electrically conductive material.

The term "locally" generally refers to a specific place, respectively a location of the gate member within the narrow, channel-like structure formed between the layer of electrically conductive material and the first heating track or the second heating track. The gate member may be arranged within a portion of the gap between the layer of electrically conductive material and the first heating track section or the second heating track section. In other words, the gate member may be in contact with the electrically conductive material and one of the neighboring heating track sections.

One advantage of the proposed electric heating and capacitive sensing arrangement is that due to the small size of the gate member, an electrical sensing signal may pass the gate member whilst a flow of an electric heating current to the layer of conductive material is prevented. This may allow during a capactivie sensing operation that the electrically conductive layer providing a relatively high surface conductivtiy may function as a part of an antenna contributing to the generation of an active area of the capacitive sensing arrangement. In other words, during a capacitive sensing operation the active area of the electric heating and capactive sensing arrangement may be defined by the heating tracks as well as the electrically conductive layer.

Another advantage of the proposed electric heating and capacitive sensing arrangement is that its structure is less perceivable to a user. Due to the layer of electrically conductive material filled in the gap between the first heating track section and the second heating track section, a depth generating a perceivable curvature between the adjacent heating tracks is not present. The heating arrangement may also be advantageously installed underneath a cover, such as for example a textile steering wheel cover.

Due to the layer of electrically conductive material arranged between the heating track sections, one further advantage of the proposed electric heating arrangement is that an enhanced homogeneity in terms of heat dissipation may be provided during a heating operation. The electrically conductive material on the substrate between the heating tracks may provide a function similar to a thermal bridge. The electrically conductive layer may facilitate a heat transfer originating from the heating tracks and/or the heated substrate by providing a path of merely small resistance for said heat transfer, e.g. a heat transfer based on conduction. As a consequence, the thermal resistance of the electric heating arrangement is lowered and the heat energy provided by the heating tracks may be dissipated evenly via the layer of electrically conductive material, respectively a surface of said material. As a result, the generation of hot spots caused by the heating tracks, and/or cold areas caused by the gaps may be lessened or entirely prevented.

The present invention is in particular usable in the field of automotive applications, but could also be used with advantage in building construction or in medical applications. The term "automotive", as used in this patent application, shall particularly be understood as being suitable for use in vehicles including passenger cars, trucks, semi-trailer trucks and buses.

In preferred embodiments, the gate member, the electrically conductive heating track and/or the layer of electrically conductive material are formed of the same material. In cases if the gate member, the electrically conductive heating track and/or the layer of electrically conductive material are made of the same material, the electric heating and capacitive sensing arrangement may provide an increased homogeneity in terms of capacitive sensing. Alternatively, the gate member, the electrically conductive heating track and/or the layer of electrically conductive material may be formed of different materials.

It will be appreciated, that in order to prevent the heating current during the heating operation to dissipate through the layer of electrically conductive material, a length extension of the gate member in the direction of extension of the first and second track section should be substantially smaller than the length extension of the layer of electrically conductive material in that direction. The length extension of the gate member may e.g. be at least 50 times smaller than the length extension of the layer of electrically conductive material in that direction, preferably at least 100, and even more preferably at least 200 times smaller than the length extension of the layer of electrically conductive material. In a possible embodiment in which the layer of electrically conductive material extends over a distance of 50 cm, the gate member has preferably a length in a range of several mm, e.g. between 1 mm and 10 mm. Due to the particularly small length of the gate member, no heating current may pass through the gate member to the layer of conductive material, yet the gate member enables during a capacitive sensing operation the electrical conductive layer to function as an active sensing area. It will be appreciated, that the length extension of the gate member should be high enough to enable a low ohmic path between the layer of electrically conductive material and the respective heating track section and to withstand the mechanical stress in a mounting or assembly process. This means that the length of the gate member may depend on a mounting process of the arrangement. For example, in cases wherein it is expected that high stresses may apply to the electric heating and capacitive sensing arrangement during its mounting on a further component, such as e.g. a steering wheel, the gate member may also be configured to have a length of approximately 3 mm. A gate member having a length of 3 mm or more may provide higher resistance to external mechanical forces. At the same time the length extension of the gate member should be low enough to avoid a resistance change of the overall heater track and second heating track section. This requirement is best achieved if the length extension of the gate member is preferably at least 200 times smaller than the length extension of the layer of electrically conductive material.

In preferred embodiments, a thickness of the layer of electrically conductive material and a thickness of the first heating track section and/or the second heating track section are substantially equal. The term "thickness" may refer to a height dimension of a heating track with respect to the surface of the substrate. Due to the same thickness of the layer of electrically conductive material and the first heating track section and/or the second heating track section, the electric heating and capacitive sensing arrangement is less perceivable by a user. Furthermore, the equal thickness may also result in a more uniform heat dissipation and an enhanced homogeneity of the capacitive sensing function.

In preferred embodiments, the substrate comprises a conductive textile or a foil. The use of a textile or foil may enhance the stretchability, respectively the extensibility, and the flexibility of the electric heating and capacitive sensing arrangement. As a result, a mounting of said electric heating and capacitive sensing arrangement on another component, such as e.g. a steering wheel, is facilitated.

In embodiments, an insulating material may be arranged on the surface of the substrate between the layer of electrically conductive material and the first heating track section and/or the second heating track section. The insulating material may have a rather weak thermal insulating property, such that a specific predeterminable amount of heat may dissipate through said insulating material. In addition, the insulating material may additionally prevent shortcuts between the layer of electrically conductive material and the first heating track section and/or the second heating track section. Furthermore, the arrangement of an insulating material on the surface of the substrate between the layer of electrically conductive material and the first heating track may further contribute to the perception of a perceivable unevenness, respectively a curvature.

In preferred embodiments, each of the first heating track section and the second heating track section has a first wavelike shape extending along a length direction of the electric heating arrangement. The term "length direction" may refer to a direction defined by a length dimension of the electric heating and capacitive sensing arrangement. The wavelike shape may further increase the stretchability of the heating arrangement. In addition, said wavelike shape further enhances a uniform heat dissipation as well.

In preferred embodiments, the first heating track section has an inner radius with respect to an inner apex at a first edge of said heating track section, wherein said inner radius extends over a portion of the first heating track section to a second edge of the first heating track section, and wherein the first heating track section has an outer radius with respect to an outer apex at the second edge, wherein said outer radius extends over a portion of the gap to a first edge of the second heating track section; and wherein the inner radius and the outer radius are equal. The term "apex" may refer to a peak point on the edge of a heating track section. For example, an apex can be a point on the edge at which the edge does not have a slope. The mathematical term "slope", respectively gradient, may refer to a number describing the direction and the steepness of a line. The inner radius may extend from a first edge of the first heating track section over a portion of said first heating track section. Further for example, the inner apex and the outer apex may be aligned to one another. The outer radius may extend from a second edge of the first heating track section over a portion of the gap, respectively the electrically conductive material arranged in the gap, to a first edge of the second heating track section. This arrangement may allow a particularly uniform heat transfer from the heating track sections to the electrically conductive material, whilst further enhancing the stretchability.

In preferred embodiments, the electrically conductive track comprises at least one of the following: Cu, Ni, Ag, Al, or mixtures thereof. A heating track comprising Copper (Cu), Nickel (Ni), Silver (Ag) or Aluminum (Al) may provide an enhanced electrical and thermal conductivity.

In preferred embodiments, the electrically conductive heating track comprises a plurality of heating traces electrically connected in parallel to one another, wherein a first heating trace of the plurality of heating traces comprises the first heating track section, and wherein a second heating trace of the plurality of heating traces comprises the second heating track section. The arrangement of several heating traces may further enhance a particularly fast heat dissipation and allows to provide a particularly large active sensing area.

In preferred embodiments, the electrically conductive heating track has a meandering shape or a U-shape, wherein said first heating track section and said second heating track section are formed by adjacent branches of said meandering shape or a U-shape. The first heating track section and the second heating track section may each form a branch, respectively a segment, of the meandering shape or the U-shape. The meandering shape or U-shape of the heating track allows a comparatively large coverage of an area to be heated and also provides an enlarged active area.

In embodiments, the electrically heating and capacitive sensing arrangement may comprise a control unit configured for determining a heating power applied to the heating and sensing arrangement by means of a terminal contacting the electrically conductive track. The control unit may be further configured to process the capacitive sensing. In addition, the control unit may for example allow a switch between a heating operation and a capacitive sensing operation.

In another aspect of the invention, the object is achieved by a steering wheel heater for an automotive application comprising an electric heating and capacitive sensing arrangement constructed according to one or more embodiments of the invention. The steering wheel heater further comprises a current source connectable to contact terminals of the electrically conductive heating track, a control unit configured for connecting said current source to said terminals for controlling a heating operation in accordance, and a capacitive sensing circuit for transmitting the capacitive sensing signal.

The benefits described in context with the proposed electric heating and capacitive sensing arrangement apply also to the proposed steering wheel heater to the full extent.

According to another aspect, the invention relates to a method of manufacturing an electric heating and capacitive sensing arrangement, the method comprising at least the following steps: providing a planar substrate, applying an electrically conductive heating track on a surface of the substrate, the electrically conductive heating track comprising at least a first heating track section and a second heating track section extending at a distance along each other on said substrate, whereby a gap is formed between said first heating track section and the second heating track section. The method further comprises the steps of applying a layer of an electrically conductive material on the surface of the substrate in said gap, wherein a width of said layer of electrically conductive material is smaller than a width of said gap between the first heating track section and second section heating track section, wherein the layer of electrically conductive material is located on the substrate so as to be separated from the first heating track section and the second section heating track section. The method further comprises the steps of applying an electrically conductive material so as to form a gate member on the surface of the substrate in the gap, wherein the gate member is arranged within a portion of the gap and extending between the layer of electrically conductive material and a single one of the first heating track section and second heating track section so as to locally connect the layer of electrically conductive material to the one of said first heating track section and second heating track section.

The benefits described in context with the proposed electric heating and capacitive sensing arrangement apply also to the proposed method to the full extent.

The invention also concerns a further method of manufacturing an electric heating and capacitive sensing arrangement, the method comprising at least the following steps: providing a planar substrate, applying a layer of electrically conductive material on a surface of the substrate, selectively removing portions of said electrically conductive material so as to form an electrically conductive heating track comprising at least a first heating track section and a second heating track section extending at a distance along each other on said substrate, and an intermediate section of conductive material arranged between said first heating track section and said second heating track section. A width of said intermediate section of conductive material is smaller than a width of a gap between said first heating track section and second heating track section. Selectively removing of the electrically conductive material is performed in such a way that the intermediate section of conductive material is separated from said both the first heating track section and the second section heating track section, and wherein the selectively removing is further performed so as to form a gate member on the surface of the substrate in the gap, wherein the gate member is arranged within a portion of the gap and extending between the layer of electrically conductive material and a single one of said first heating track section and second heating track section so as to locally connect the layer of electrically conductive material to the one of said first heating track section and second heating track section.

The term "intermediate section" may refer to a layer of electrically conductive material.

The benefits described in context with the proposed electric heating and capacitive sensing arrangement apply also to the proposed further method to the full extent.

In preferred embodiments, the step of selectively removing of the electrically conductive material is carried out by using a cutting process, a laser cutting process, a partial kiss-cut process, a contour-cutting process or an etching process, whereby the electrically conductive material is at least partially cut or etched from an outside to the substrate. The term "outside" refers to a side of the electrically conductive material facing an exterior environment. The cutting process may cause a partial cut, which refers to a cut where the material to be cut is cut away to a predetermined depth.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies one or more embodiments of the invention in particular in connection with the figures.

BRIEF DESCRIPTION OF THE DRAWINGS

Further details and advantages of the present invention will be apparent from the following detailed description of not limiting embodiments with reference to the attached drawing, wherein.

DETAILED DESCRIPTION

Figure 1:
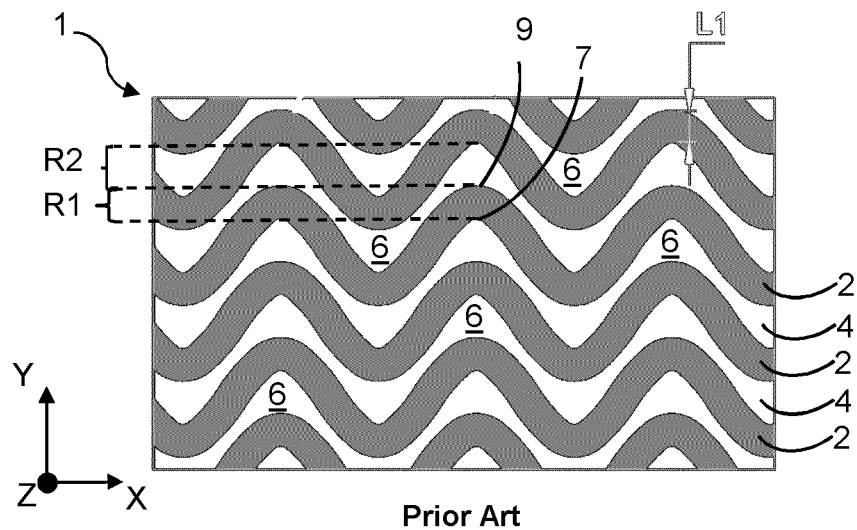
FIG. 1 schematically illustrates a section of a prior art heating device in a top view.

FIG. 1 is a schematic top view of a prior art heating device 1, wherein the device 1 consists of a plurality of electrically conductive heating lines 2 forming part of a heating track (not shown). The heating lines 2 are electrically connected in parallel. The heating lines 2 are disposed on a supporting substrate 4. The heating and capacitive sensing device further presents a plurality of recesses 6, wherein each recess is arranged in between two neighboring heating lines 2, thereby exposing the substrate 4. As can be further derived from FIG. 1, the heating lines 2 present an irregular serpentine-like shape along a direction parallel to a length direction X of the heating device 1. An inner radius R1 of a serpentine-like heating line 2 with respect to an inner apex 7 on a first edge of said heating line 2 is different from an outer radius R2 with respect to an outer apex 9. The width L1 of a heating line 2 slightly varies at each point along the heating line 2. In consequence, this heating and capacitive sensing device may be prone to the generation of hot spots and/or cold areas during operation of the heating arrangement 1.

Figure 2:
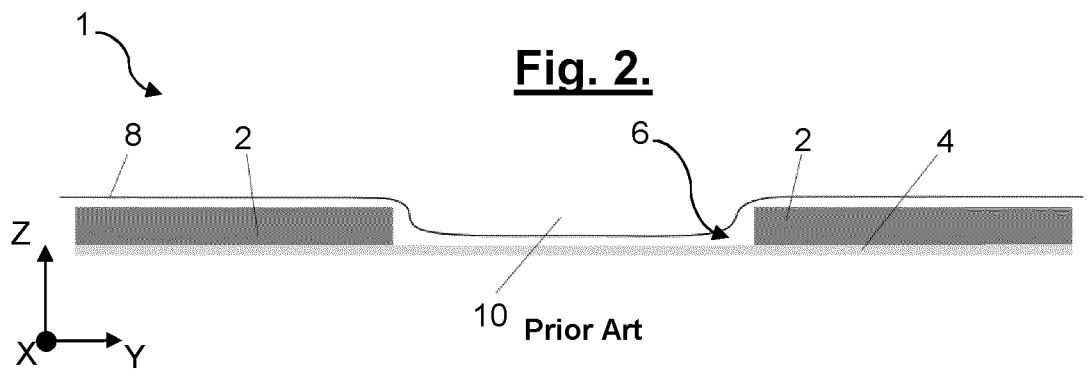
FIG. 2 schematically illustrates a cross-section through two adjacent heating lines of the prior art heating device pursuant to FIG. 1, wherein an additional cover is mounted.

FIG. 2 is a schematic sectional view of the prior art electric heating device 1 illustrated by FIG. 1, wherein two adjacently arranged heating lines 2 are illustrated. FIG. 2 also shows a trim cover 8 of a steering wheel (not shown) mounted on the heating device 1. As can be derived from FIG. 2, the absence of material within the recess 6 between the heating lines 2 causes the cover 8 to extend unevenly over the heating arrangement 1. As a consequence, the cover forms a curvature 10 at locations where the cover 8 contacts the substrate 4. These curvatures 10 are perceivable by a user and may also be prone to inhomogeneities of heat dissipation.

The heating lines 2 may be used as an antenna for performing a capacitive sensing. However, the recess 6 does not form part of an active area during such a capacitive sensing.

Figure 3:
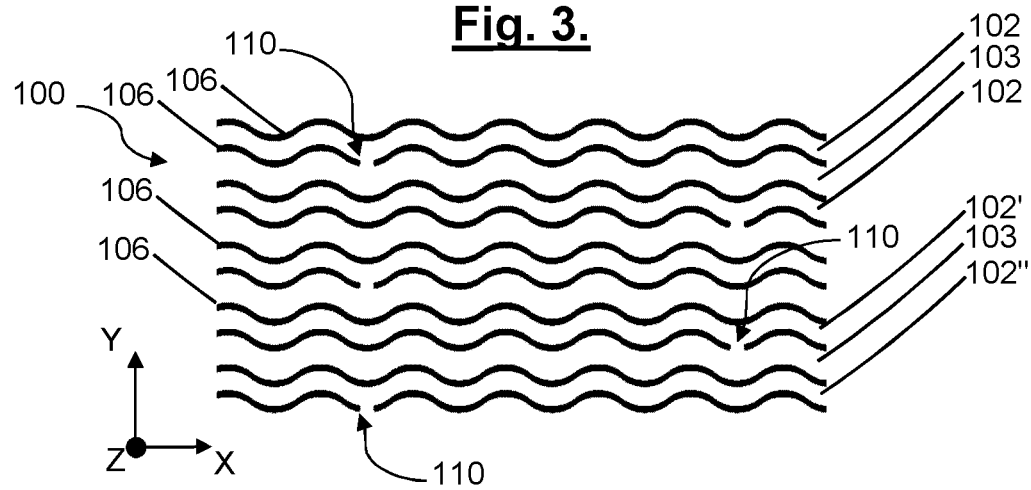
FIG. 3 schematically illustrates a section of a top view of an electric heating and capacitive sensing arrangement according to an embodiment.
Figure 4:
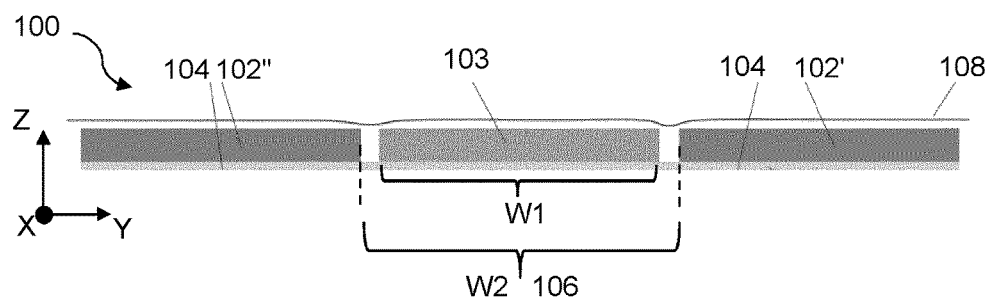
FIG. 4 schematically illustrates a sectional view of FIG. 3, wherein two heating track sections and a layer of electrically conductive material are illustrated, and wherein a trim cover is mounted on the electric heating and capacitive sensing arrangement.

FIG. 3 illustrates schematically a section of a top view of an electric heating and capacitive sensing arrangement 100 according to an embodiment, wherein gate members 110 connect locally an electrically conductive layer 103 to a respective adjacent heating track section 102. In this context, FIG. 4 is a schematic sectional view of the electric heating and capacitive sensing arrangement 100 illustrated by FIG. 3, wherein two heating track sections 102 and a layer of electrically conducive material 103 are illustrated. It should yet be noted, that a gate member 110 is not illustrated in FIG. 4. The heating track sections 102 shown in the embodiment illustrated by FIG. 3 may be part of a single heating track, wherein the heating track sections 102 are connected to each other in parallel. The electrically conductive heating track is connectable to a current source (not shown), so that during a heating operation a heating current flows through said electrically conductive heating track and the plurality of heating track sections 102.

Each heating track section 102 extends at a distance along a neighboring heating track section 102 on the substrate 104, whereby a gap 106 is formed, respectively defined, between the two spaced apart, heating track sections 102. This is also illustrated in FIGS. 3 and 4 by the first heating track 102' and the second heating track section 102". A layer of electrically conductive material 103 is arranged on said surface of the substrate 104 in said gap 106 between the heating track sections 102, respectively the first heating track section 102' and the second heating track section 102". The thickness of the layer of electrically conductive material 103 and the thickness of the heating track sections 102 are substantially equal. The substrate 104 comprises a flexible textile or a foil.

As can be derived from FIG. 4, the width W1 of said layer 103 of electrically conductive material is smaller than a width W2 of said gap 106 between the two heating track sections 102. The layer of electrically conductive material 103 is thus arranged so as to be separated from its adjacently arranged heating track sections 102, which is illustrated by the black linings in FIG. 3. In other words, a narrow channel-like structure is formed between an edge of the layer of electrically conductive material 103 and a corresponding, adjacent heating track section 102', 102". As a consequence, the layer of electrically conductive material 103 is separated from the adjacent heating track sections.

The gate member 110 is formed of an electrically conductive material and is arranged within a portion of said gap 106 such that the gate member 110 extends between the layer of electrically conductive material 103 and an adjacent first heating track section 102' or second heating track section 102". In other words, the gate member 110 is arranged within the narrow, channel-like structure formed between the edge of the layer of electrically conductive material 103 and an adjacent heating track 102. The gate member 110 thereby connects a single heating track section locally to the layer of electrically conductive material 103. The gate member 110, the layer 103 as well as the heating track are formed of the same material.

During a heating operation, a heating current flows through the electrically conductive track and the plurality of heating track sections 102. During a capacitive sensing operation, a capacitive sensing signal is applied to the electrically conductive track. Whilst a heating current may not pass the gate member 110, a capacitive sensing signal is transmitted during a capacitive sensing operation. As a result, the layer of electrically conductive material 103 enlarges the sensing area.

Due to the particularly small difference of the widths W1 and W2, as well as the thermal conductivity of the electrically conductive layer 103, the heat emitted by the neighboring heating track sections 102 may be absorbed by the layer of electrically conductive material 103 during operation of the heating arrangement 100. This may results in a particular homogeneous heat dissipation.

It should be further noted that each heating track section may have a width in a range of 2 mm to 10 mm, preferably in a range from 4 mm to 8 mm, most preferred of 6 mm. The wavelength is in a range of 12 mm to 18 mm, preferably in a range from 14 mm to 16 mm, most preferred of 15 mm.

FIG. 4 shows a trim cover 108 mounted on the electric heating and capacitive sensing arrangement 100, wherein the trim cover 108 is configured for a steering wheel (not shown). The trim cover 108 expands evenly over the heating track sections 102 as well as the electrically conductive layer 103. The trim cover 108 may comprise an insulating material. Portions of the trim cover 108 protrude in the channel-like structures between the layer of electrically conductive material 103 and an adjacent heating track section 102 on the surface of the substrate 104. As a consequence, the electric heating and capacitive sensing arrangement 100 is less or not at all perceivable by a user and the formation of curvatures is significantly reduced. In addition, said protruding portions of the trim cover 108 may also provide an electric isolation between the layer of electric conductive material 103 and an adjacent heating track section 102 which is not connected to the layer 103 by a gate member 110. In alternative embodiments (not shown), merely an insulating material may be arranged on the surface of the substrate 104 between the layer of electrically conductive material 103 and a heating track section.

Figure 5:
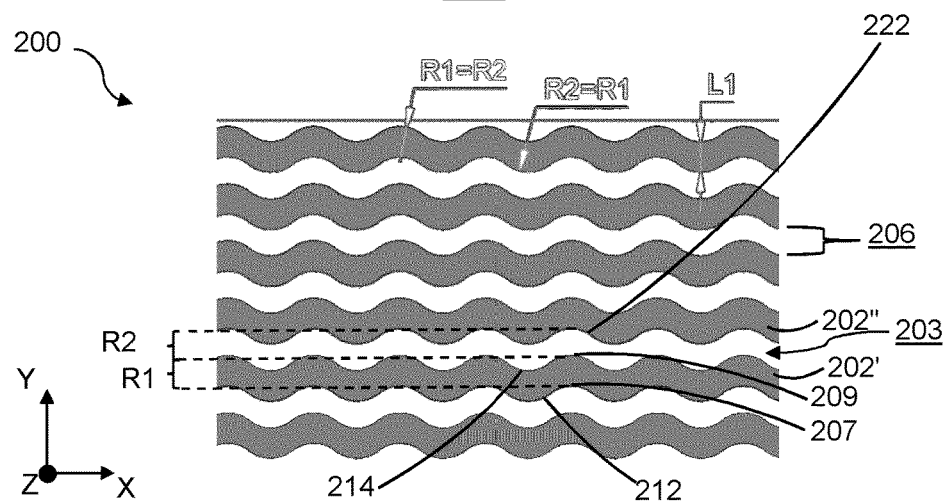
FIG. 5 schematically illustrates a section top view of an electric heating and capacitive sensing arrangement according to another embodiment.

FIG. 5 is a schematic top view of an electric heating and capacitive sensing arrangement 200 according to another embodiment of the invention. The embodiment illustrated by FIG. 5 is similar to the embodiment illustrated by FIGS. 3 and 4, except for the inner radius R1 and the outer radius R2, which are equal in the embodiment shown in FIG. 5. It should be noted that the gate members are not shown in FIG. 5. Each heating track section 202 has a wavelike shape extending along a length direction X of the electric heating and capacitive sensing arrangement 200. In the embodiment illustrated by FIG. 5, a first heating track section 202' has an inner radius R1 with respect to an inner apex 207 at a first edge 212 of said heating track section 202'. The inner radius R1 extends over a portion of the first heating track section 202' to a second edge 214 of the first heating track section 202'. The first heating track section 202' has also an outer radius R2 with respect to an outer apex 209 at the second edge 214 of said first heating track sections 202'. The outer radius R2 extends over a portion of the gap 206, respectively the layer of electrically conductive material 203 arranged within the gap 206, to a first edge 222 of the second heating track section 202". Both, the inner radius R1 and the outer radius R2 may have an equal length in a range of 2 mm to 10 mm, preferably in a range from 4 mm to 8 mm, most preferred a length of 6 mm. Also, the width L1 of each heating track section 202 is constant. The width L1 is in a range of 2 mm to 10 mm.

Figure 6:
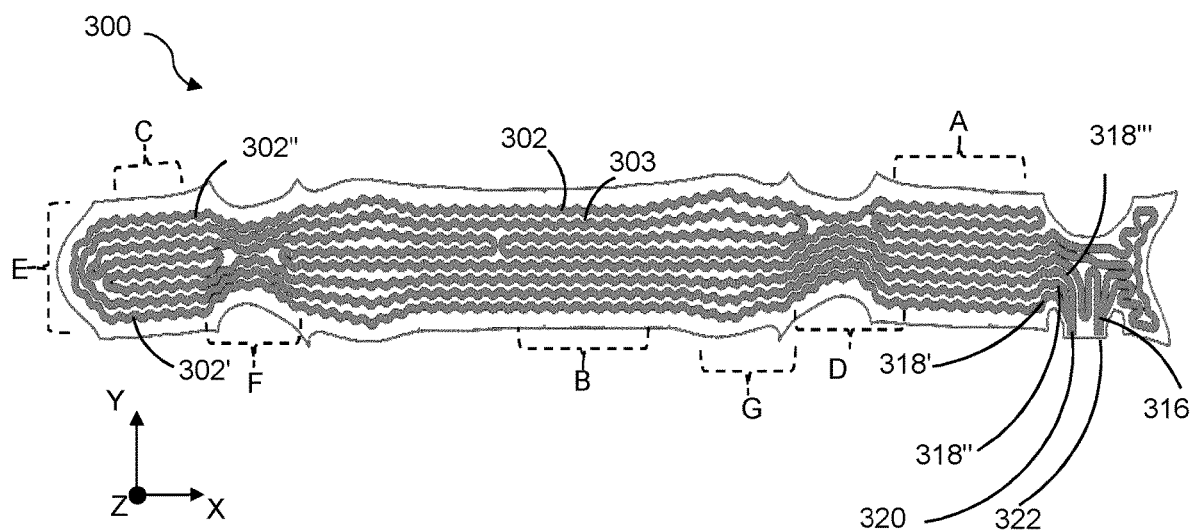
FIG. 6 schematically illustrates a top view of a steering wheel heater comprising an electric heating and capacitive sensing arrangement according to an embodiment.
Figure 7:
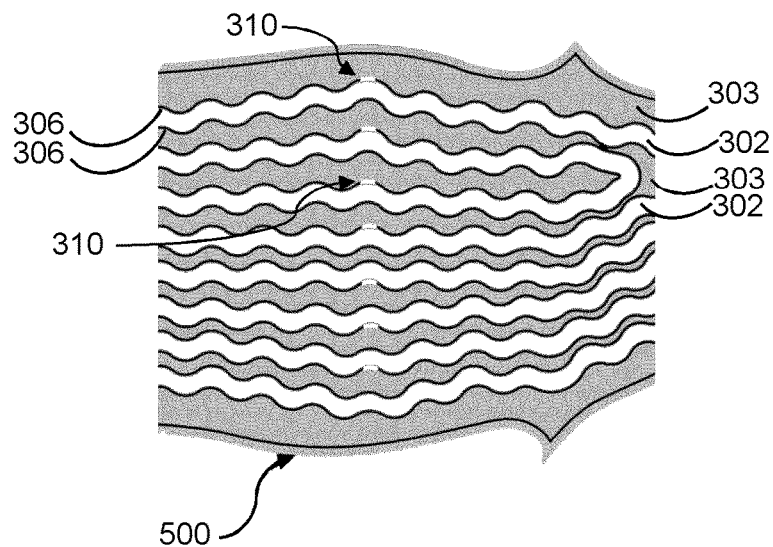
FIG. 7 is an enlarged view of section G of FIG. 6.

FIG. 6 illustrates in a schematic top view a further embodiment of an electric heating and capacitive sensing arrangement 300, respectively a steering wheel heater comprising an electric heating and capacitive sensing arrangement. The embodiment shown in FIG. 6 is adapted to be mounted on a steering wheel (not shown). The electric heating arrangement 300 comprises a plurality of sections A, B, C, each presenting a structure according to the embodiment illustrated in FIG. 5. As can be seen in e.g. section B, the layer of electrically conductive material 303 extends in a gap between neighboring heating track sections 302. The gate members 310 (not shown in FIG. 6) connect each layer of electrically conductive material 303 to a single neighboring heating track section 302. This is illustrated in FIG. 7 showing an enlarged view of section G of FIG. 6.

The electric heating and capacitive sensing arrangement 300 comprises an electrically conductive heating track 316 comprising a plurality of heating traces 318', 318", 318"', wherein said heating traces are electrically connected to one another. The heating track 316 has a meandering shape at sections D and F of the heating arrangement 300. In addition, the heating track has a U-shaped portion in section E. As can be derived from FIG. 6, the heating track 316 comprises the heating trace 318' having an U-shaped portion which is at least partially formed by the first heating track section 302' and the second heating track section 302". The first heating track section 302' and the second heating track section 302" form both a branch of the U-shape. Due to the meandering shape and the U-shaped portions of the heating track, the electric heating and capacitive sensing arrangement uniformly dissipates heat over a particularly large areal.

The electric heating and capacitive sensing arrangement 300, respectively the steering wheel heater comprising the electric heating and capacitive sensing arrangement, may further have two contact terminals 320, 322. The two contact terminals 320, 322 are connectable to an electric source. The contact terminals are arranged at end portions of the electrically conductive heating track 316. The contact terminals may be connected to a control unit (not shown) configured for connecting said current source to said terminals 320, 322 for controlling a heating operation in accordance. The control unit may further control and/or process a capacitive sensing operation.

Figure 8:
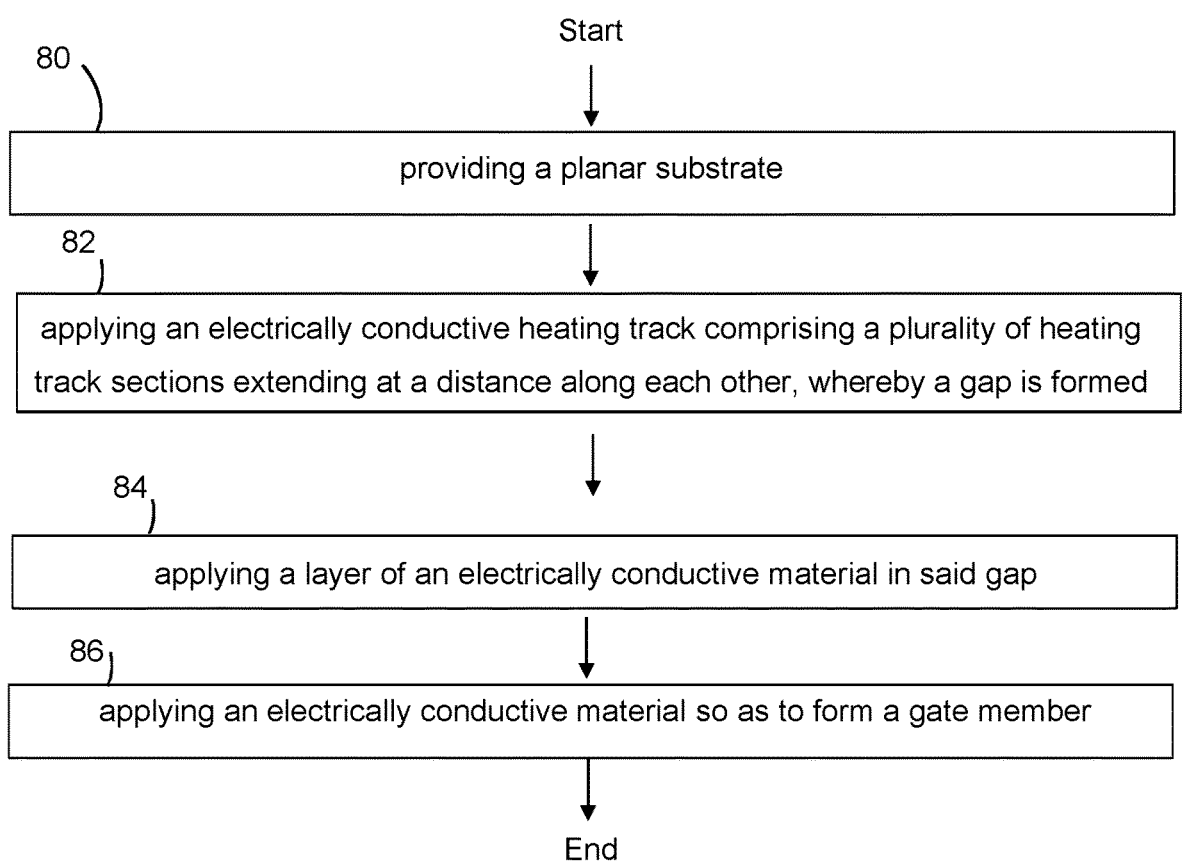
FIG. 8 is a flowchart of a method in accordance with an embodiment of the invention of manufacturing the electric heating and capacitive sensing arrangement pursuant to any one of FIGS. 3 to 6.

FIG. 8 is a flowchart of a method of manufacturing the electric heating and capacitive sensing arrangement pursuant to any embodiment illustrated by FIGS. 3-7. Steps of the method will be described with reference to FIGS. 3 and 4.

The method of manufacturing an electric heating and capacitive sensing arrangement 100 comprises the following steps: In one step 80, a planar substrate 104 is provided. In a further step 82, an electrically conductive heating track is applied on a surface of said substrate 104. The electrically conductive heating track comprises at least a first heating track section 102' and a second heating track section 102" extending at a distance W2 along each other on said substrate 104, whereby a gap 106 is formed between said first heating track section 102' and the second heating track section 102".

In another step 84, a layer of an electrically conductive material 103 is applied on said surface of the substrate 104 in said gap 106, wherein a width W1 of said layer of electrically conductive material 103 is smaller than a width W2 of said gap 106 between said first heating track section 102' and second section heating track section 102". The layer of the electrically conductive material 103 is located on the substrate 104 so as to be separated from said first heating track section 102' and said second section heating track section 102".

In another step 86, an electrically conductive material is applied on the surface of the substrate in the gap so as to form a gate member 110, wherein the gate member 110 is arranged within a portion of the gap 106 and extending between the layer of electrically conductive material 103 and a single one of the first heating track section 102' and the second heating track section 102" so as to locally connect said layer of electrically conductive material 103 to the one of the first heating track section 102' and second heating track section 102".

It should be noted that the steps 82, 84 and 86 may be carried out simultaneously or subsequently. It should be further noted that the order of steps 82, 84 and 86 may be altered.

Figure 9:
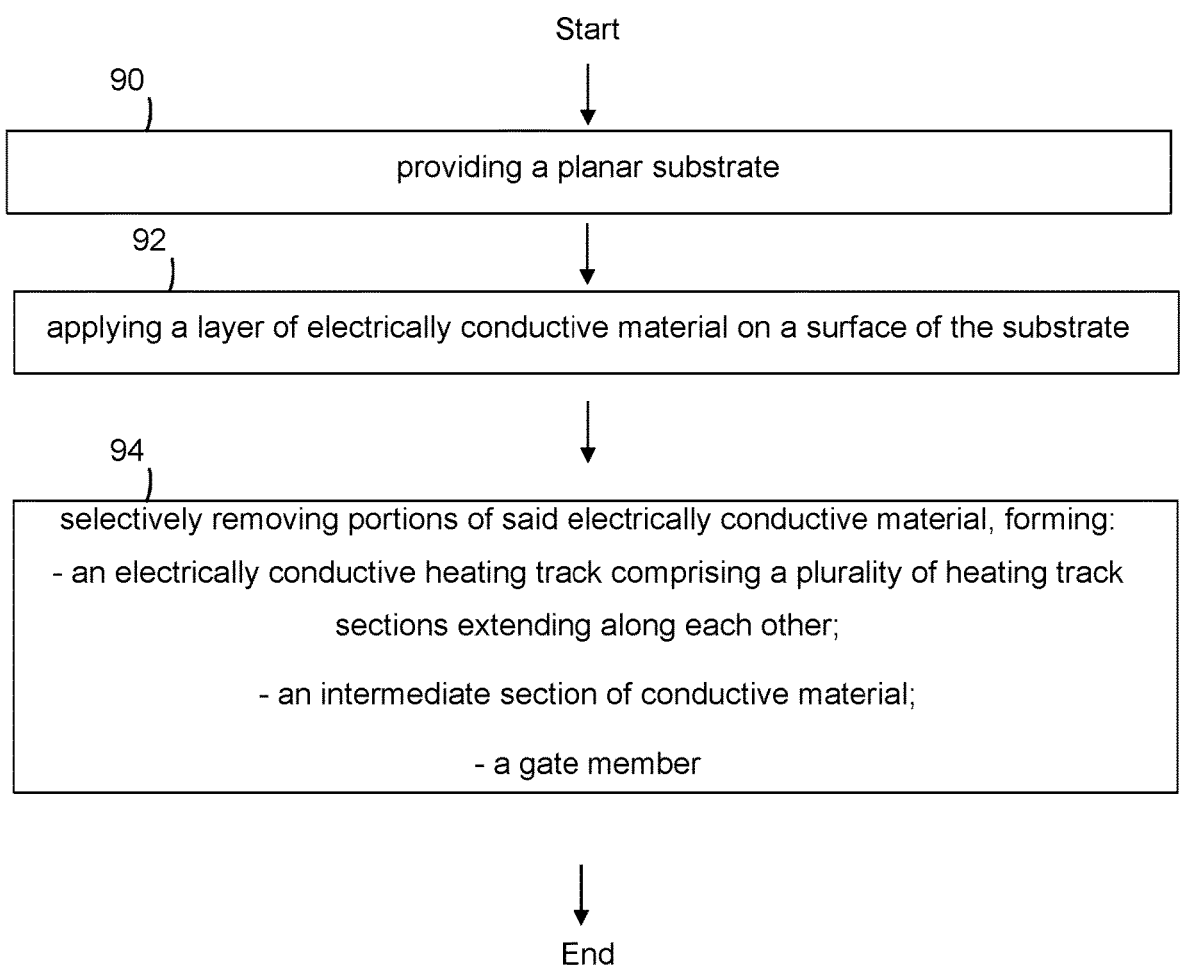
FIG. 9 is a flowchart of another method in accordance with another embodiment of the invention of manufacturing the electric heating and capacitive sensing arrangement pursuant to any one of FIGS. 3 to 6.

FIG. 9 is a flowchart of a further method of manufacturing the electric heating and capacitive sensing arrangement pursuant to any embodiment illustrated by FIGS. 3-6. Steps of the method will be described in the following with reference to FIGS. 3 and 4.

The further method of manufacturing an electric heating and capacitive sensing arrangement 100 comprises the following steps: In one step 90, a planar substrate 104 is provided. In a further step 92, a layer of an electrically conductive material is applied on a surface of the substrate 104. In another step 94, portions of said electrically conductive material are selectively removed so as to form an electrically conductive heating track comprising at least a first heating track section 102' and a second heating track section 102" extending at a distance W2 along each other on said substrate 104, and an intermediate section of conductive material 103 arranged between said first heating track section 102' and said second heating track section 102". The width W1 of said intermediate section of conductive material 103 is smaller than a width W2 of a gap 106 between said first heating track section 102' and second heating track section 102".

The step 94 of selectively removing of the electrically conductive material is performed in such a way that the intermediate section of conductive material 103 is separated from said both said first heating track section 102' and said second section heating track section 102". The step 94 of selectively removing the electrically conductive material is further performed so as to form a gate member 110 on the surface of the substrate 104 in the gap 106, wherein the gate member 110 is arranged within a portion of the gap 106 and extending between the layer of electrically conductive material 103 and a single one of the first heating track section 102' and second heating track section 102" so as to locally connect said layer of electrically conductive material 103 to the one of the first heating track section 102' and second heating track section 102".

In a preferred embodiment, the step 94 of selectively removing of the electrically conductive material 103 is carried out by using a cutting process, a laser cutting process, a partial kiss-cut process, a contour-cutting process or an etching process, whereby the electrically conductive material is at least partially cut or etched from an outside to the substrate 104.

While embodiments of the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:
1. An electric heating and capacitive sensing arrangement comprising:
   a planar substrate;
   an electrically conductive heating track arranged on a surface of said substrate, said electrically conductive track being connectable to a current source so that during a heating operation a current flows through said electrically conductive track and said electrically conductive track being connectable to a capacitive sensing circuit so that during a sensing operation a capacitive sensing signal is applied to the electrically conductive track, wherein said electrically conductive track comprises at least a first heating track section and a second heating track section extending at a distance along each other on said substrate, whereby a gap is formed between said first heating track section and the second heating track section;

wherein the heating and sensing arrangement further comprises:

a layer of electrically conductive material arranged on said surface of the substrate in said gap between the first heating track section and the second heating section track section; wherein a width of said layer of electrically conductive material is smaller than a width of said gap between said first heating track section and second heating track section; wherein said layer is arranged so as to be separated from said first heating track section and said second heating track section; and a gate member of electrically conductive material, said gate member being arranged within a portion of said gap and extending between the layer of electrically conductive material and a single one of said first heating track section and second heating track section so as to locally connect said layer of electrically conductive material to said one of said first heating track section and second heating track section.

2. The heating and sensing arrangement according to claim 1, wherein the gate member, the electrically conductive heating track and/or the layer of electrically conductive material are formed of the same electrically conductive material.

3. The heating and sensing arrangement according to claim 1, wherein a length extension of the gate member in the direction of extension of the first and second track section is at least 50 times smaller than the length extension of the layer of electrically conductive material in that direction, preferably the length extension of the of the gate member is at least 100 times smaller than the length extension of the layer of electrically conductive material, and even more preferably the length extension of the of the gate member is at least 200 times smaller than the length extension of the layer of electrically conductive material.

4. The heating and sensing arrangement according to claim 1, wherein a thickness of the layer of electrically conductive material and a thickness of the first heating track section and/or the second heating track section are substantially equal.

5. The heating and sensing arrangement according to claim 1, wherein the substrate comprises a conductive textile or a foil.

6. The heating and sensing arrangement according to claim 1, wherein each of the first heating track section and the second heating track section has a first wavelike shape extending along a length direction of the electric heating and capacitive sensing arrangement.

7. The heating and sensing arrangement according to claim 6, wherein the first heating track section has an inner radius with respect to an inner apex at a first edge of said heating track section, wherein said inner radius extends over a portion of the first heating track section to a second edge of the first heating track section; and wherein the first heating track section has an outer radius with respect to an outer apex at the second edge, wherein said outer radius extends over a portion of the gap to a first edge of the second heating track section; and wherein the inner radius and the outer radius are equal.

8. The heating and sensing arrangement according to claim 1, wherein the electrically conductive track comprises at least one of the following: Cu, Ni, Ag, Al, or mixtures thereof.

9. The electric heating arrangement according to claim 1, wherein the electrically conductive heating track comprises a plurality of heating traces electrically connected in parallel to one another, wherein a first heating trace of the plurality of heating traces comprises the first heating track section, and wherein a second heating trace of the plurality of heating traces comprises the second heating track section.

10. The electric heating arrangement according to claim 1, wherein the electrically conductive heating track has a meandering shape or a U-shape and wherein said first heating track section and said second heating track section are formed by adjacent branches of said meandering shape or a U-shape.

11. Steering wheel heater for an automotive application comprising an electric heating and capacitive sensing arrangement according to claim 1, the steering wheel heater further comprising a current source connectable to contact terminals of the electrically conductive heating track; a control unit configured for connecting said current source to said terminals for controlling a heating operation in accordance; and a capacitive sensing circuit for transmitting the capacitive sensing signal.

* * * * *